United States Patent
Barbe et al.

(10) Patent No.: US 7,367,188 B2
(45) Date of Patent: *May 6, 2008

(54) SYSTEM AND METHOD FOR DIAGNOSTIC OF LOW PRESSURE EXHAUST GAS RECIRCULATION SYSTEM AND ADAPTING OF MEASUREMENT DEVICES

(75) Inventors: David Barbe, Ann Arbor, MI (US); Michiel J. van Nieuwstadt, Ann Arbor, MI (US); Devesh Upadhyay, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/460,704

(22) Filed: Jul. 28, 2006

(65) Prior Publication Data
US 2008/0022677 A1    Jan. 31, 2008

(51) Int. Cl.
F02B 33/44 (2006.01)
F02M 25/07 (2006.01)
G06F 7/00 (2006.01)
G06F 17/00 (2006.01)
G01M 19/00 (2006.01)

(52) U.S. Cl. .............. 60/605.2; 123/568.21; 701/108; 701/34; 73/118.2

(58) Field of Classification Search .......... 60/605.2, 60/602; 123/568.21, 568.16, 568.11, 295; 73/118.1, 118.2, 117.3; 701/108, 34
See application file for complete search history.

(56) References Cited

U.S. PATENT DOCUMENTS

| | | | | |
|---|---|---|---|---|
| 5,728,932 A * | 3/1998 | Uchikawa | ............... | 73/118.2 |
| 6,370,935 B1 * | 4/2002 | He et al. | ................. | 73/1.34 |
| 6,393,345 B1 * | 5/2002 | Kerns et al. | ............ | 123/295 |
| 6,446,498 B1 * | 9/2002 | Schricker et al. | ...... | 73/118.1 |
| 6,763,708 B2 * | 7/2004 | Ting et al. | ............ | 73/118.1 |
| 6,802,302 B1 * | 10/2004 | Li et al. | ................ | 73/118.2 |
| 6,820,599 B2 | 11/2004 | Kurtz et al. | ........ | 123/568.21 |
| 6,820,600 B1 | 11/2004 | Sisken et al. | ........ | 60/605.2 |
| 6,851,304 B2 * | 2/2005 | Cullen et al. | .......... | 73/118.2 |
| 6,863,058 B2 * | 3/2005 | Kurtz et al. | ............ | 123/672 |
| 6,899,090 B2 | 5/2005 | Arnold | .................. | 60/605.2 |
| 6,945,239 B2 * | 9/2005 | Moser et al. | ........ | 123/568.2 |
| 6,952,640 B2 * | 10/2005 | Bleile et al. | ........... | 701/108 |
| 7,047,741 B2 * | 5/2006 | Gray, Jr. | ............... | 60/605.2 |
| 2004/0182079 A1 | 9/2004 | Akao et al. | ............ | 60/605.2 |
| 2006/0156724 A1 * | 7/2006 | Dismon et al. | ........ | 60/605.2 |
| 2007/0068158 A1 * | 3/2007 | Sun et al. | .............. | 60/605.2 |
| 2007/0125075 A1 * | 6/2007 | Zanini-Fisher et al. | .... | 60/295 |
| 2007/0125349 A1 * | 6/2007 | Zanini-Fisher et al. | .... | 123/679 |
| 2007/0144501 A1 * | 6/2007 | Joergl et al. | .......... | 60/605.2 |

* cited by examiner

*Primary Examiner*—Thai-Ba Trieu
(74) *Attorney, Agent, or Firm*—Julia Voutyras; Alleman Hall McCoy Russell & Tuttle LLP

(57) ABSTRACT

A system for a diesel engine having an intake manifold and an exhaust manifold, comprises a turbocharger between the intake and exhaust manifolds; a low pressure exhaust gas recirculation system having a first valve coupled thereto for regulating flow; a high pressure exhaust gas recirculation system having a second valve coupled thereto for regulating flow; a first mass airflow sensor coupled in the engine intake manifold; and a control system configured to diagnose the degradation of the first mass airflow sensor.

15 Claims, 11 Drawing Sheets

SYSTEM AND METHOD FOR DIAGNOSTIC OF LOW PRESSURE EXHAUST GAS RECIRCULATION SYSTEM AND ADAPTING OF MEASUREMENT DEVICES

BACKGROUND AND SUMMARY

Diesel engines may use re-ingested burnt exhaust gases to increase fuel economy and reduce emissions. For example, an exhaust gas recirculation (EGR) system may be used to recirculate exhaust gases from the exhaust manifold to the intake manifold. Such operation can displace fresh air and lower oxygen concentration in the cylinder, as well as reduce formation of NOx during combustion.

In some engine configurations that have a turbocharger, both a low pressure and high pressure EGR system may be used. For example, a high pressure (HP) EGR loop from the exhaust manifold (upstream of the turbine of turbocharger) to the intake manifold (downstream of the compressor of the turbocharger), may be used. In addition, a low pressure (LP) loop from downstream of the turbine to upstream of the compressor may also be used. See, for example, U.S. Pat. No. 6,820,599.

The inventors herein have recognized several disadvantages with such an approach. Specifically, in some engine configurations, a mass airflow (MAF) sensor may be installed to estimate or measure flows in the HP EGR and LP EGR loops. However, over time, the sensor may degrade or age, thus reducing the ability to accurately control the HP and/or LP EGR. Further, when both EGR systems are active, a reading from the MAF sensor can be biased because interactions between the two EGR systems. As such, degraded estimation, and thus control, of the HP and LP EGR systems can result.

At least some of the above issues may be addressed by a system for a diesel engine having an intake manifold and an exhaust manifold, comprising: a turbocharger between the intake and exhaust manifolds of the engine; a low pressure exhaust gas recirculation system with a first end coupled to the exhaust manifold downstream of the turbocharger and a second end couple to the intake manifold upstream of the turbocharger, said low pressure exhaust gas recirculation having a first valve coupled thereto for regulating flow; a high pressure exhaust gas recirculation system with a first end coupled to the exhaust manifold upstream of the turbocharger and a second end coupled to the intake manifold downstream of the turbocharger, said high pressure exhaust gas recirculation having a second valve coupled thereto for regulating flow; a first mass airflow sensor coupled in the engine intake manifold upstream of said second end of said low pressure exhaust gas recirculation system; and a control system configured to diagnose the degradation of said first mass airflow sensor. In this way, it is possible to identify degraded operation of the sensor and take corrective action, if necessary.

Several different diagnostic strategies can be used to detect the degradation of the MAF sensor. In one particular example, the diagnostic strategy of the MAF sensor may be based on information from a second MAF sensor. In another example, an intrusive strategy may be used where system operation is purposely adjusted to enable improved diagnosis of the MAF sensor under selected conditions. In yet another example, conditions may be opportunistically identified under which improved diagnostics may be performed, such as when a low pressure EGR valve is closed, for example.

In this way, the degradation of a MAF sensor can be diagnosed so that the control of dual EGR system may be monitored to improve robustness and/or durability.

In another embodiment, the disclosed approaches can make it possible to detect leakages or blockages of the low pressure EGR loop, and thus degradation of an EGR system can be provided.

In yet another example, a control system can provided which adapts to degradation of a MAF sensor, such as an aging effect. In this way, the EGR flows in the dual EGR system can be more accurately controlled even in the presence of sensor degradation. Thus, it is possible to provide robust control of both EGR systems by providing accurate estimation of EGR flow via adaptation of degraded MAF sensor performance.

DETAILED DESCRIPTION

Figure 1:
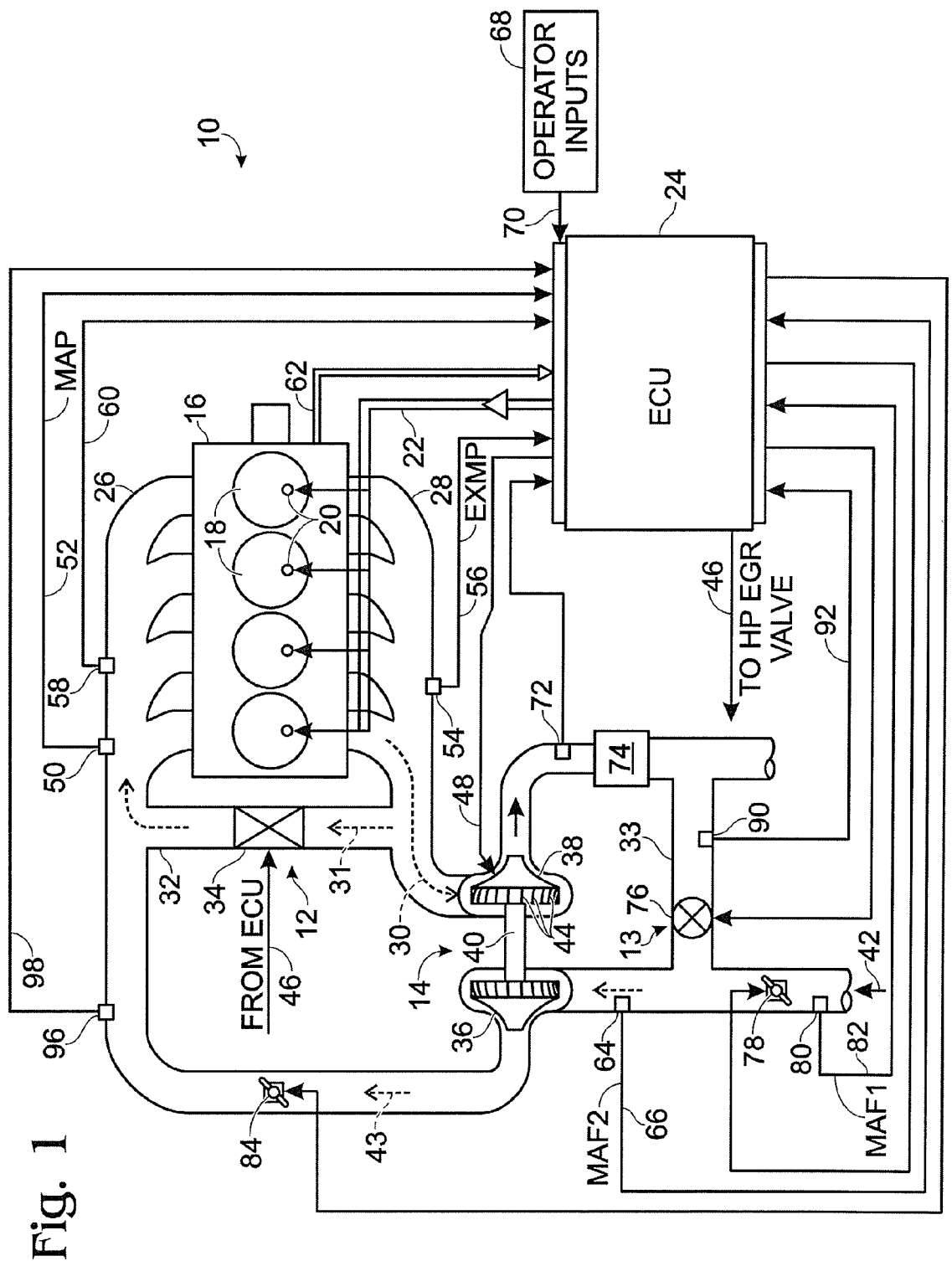
FIG. 1 is a schematic view of a compression ignition engine system having an EGR system and a VGT.

Turning first to FIG. 1, there is shown a simplified schematic diagram of a compression ignition engine system 10 equipped with a high pressure and low pressure exhaust gas recirculation (EGR) system (12 and 13, respectively) and a variable geometry turbocharger (VGT) 14. A representative engine block 16 is shown having four combustion chambers 18, although more or fewer cylinders may be used if desired. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions, the engine is equipped with an EGR system. The EGR system includes a high pressure (HP) EGR system 12, which comprises a conduit 32 connecting the exhaust manifold 28 to the intake manifold 26. This allows a portion of the exhaust gases to be circulated from the exhaust manifold 28 to the intake manifold 26 in the direction of arrow 31. A HP EGR valve 34 regulates the amount of exhaust gas recirculated from the exhaust manifold 28. The valve 34 may be a throttle plate, pintle-orifice, slide valve, or any other type of variable valve. Further, a low pressure (LP) EGR system 13 is shown, which includes a conduit 33 connecting gases from the output of the turbocharger turbine (discussed below) to the inlet of the turbocharger compressor. This allows a portion of the exhaust gases to be circulated from the exhaust to the intake upstream of the turbocharger system, and thus at lower pressures. A LP EGR valve 76, similar to valve 34, may be used to regulate the flow of LP EGR. Each of valves 34 and 76 may be controlled by ECU 24.

In the combustion chambers, the recirculated exhaust gas acts as an inert gas, thus lowering the flame and in-cylinder gas temperature and decreasing the formation of NOx. On the other hand, the recirculated exhaust gas displaces fresh air (thus decreasing oxygen content) and reduces the air-to-fuel ratio of the in-cylinder mixture which, up to a limit, may contribute toward lowering NOx production.

Turbocharger 14 uses exhaust gas energy to increase the mass of the air charge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 includes a compressor 36 and a turbine 38 coupled by a common shaft 40. The exhaust gas 30 drives the turbine 38 which drives the compressor 36 which, in turn, compresses ambient air 42 (and LP EGR gas, if present) and directs it (arrow 43) into the intake manifold 26. The VGT 14 can be modified as a function of engine speed during engine operation by varying the turbine flow area and the angle at which the exhaust gas 30 is directed at the turbine blades. This is accomplished by changing the angle of the inlet guide vanes 44 on the turbine 38. The operating position for the engine guide vanes 44 is determined from the desired engine operating characteristics at various engine speeds and loads by ECU 24.

Between turbine 38 and the LP EGR system 13 may be an emission control system 74, which may include one or more emission control devices, such as a particulate filter, oxidation catalyst, selective catalytic reduction catalyst, NOx trap, or combinations thereof. Further additional devices may be included upstream of turbine 38 and/or downstream of system 74. In one embodiment, one or more pressure and/or temperature sensors may be coupled in system 74, and used to adjust engine operation.

As can be appreciated from FIG. 1, both EGR systems 12 and 13 and the VGT 14 regulate gas flow from the exhaust manifold 28. The effect of the EGR and VGT is, therefore, jointly dependent upon the conditions in the exhaust manifold 28. EGR flows and fresh air flows may also be regulated by adjusting either the high pressure EGR throttle 84 or the low pressure EGR throttle 78, which are both controlled by ECU 24.

All of the engine systems, including the EGR systems 12 and 13, VGT 14, throttle valves 78 and 84, and fuel injectors 20 are controlled by the ECU. For example, signal 46 from the ECU 24 regulates the HP EGR valve position, and signal 48 regulates the position of the VGT guide vanes 44.

In the ECU 24, the command signals 46, 48 to the EGR system 12 and VGT 14 actuators, as well as other command signals, are calculated from measured variables and engine operating parameters. Sensors and calibratable lookup tables provide the ECU 24 with engine operating information. For example, manifold absolute pressure (MAP) sensor 50 provides a signal 52 to the ECU 24 indicative of the pressure in the intake manifold 26 downstream of the HP EGR entrance and pressure sensor 96 provides a signal 98 indicative of pressure upstream of the HP EGR entrance in the intake manifold. Likewise, exhaust manifold pressure (EXMP) sensor 54 provides an EXMP signal 56 to the ECU 24 indicative of the pressure in the exhaust manifold 28 upstream of the HP EGR exit. Further, an air charge temperature sensor 58 provides a signal 60 to the ECU 24 indicative of the temperature of the intake air charge 42. A first mass airflow (MAF1) sensor 80 and a second mass airflow (MAF2) sensor 64 also provide signals 82 and 66 respectively indicative of the respective airflows in the intake system to the ECU 24. While FIG. 1 shows sensor 80 in the intake manifold upstream of the LP EGR inlet and upstream of throttle 78, it may also be located downstream of the throttle, for example. Further, while FIG. 1 shows sensor 64 in the intake manifold downstream of the LP EGR inlet and upstream of the HP EGR inlet and upstream of turbocharger 14, sensor 64 may also be located downstream of turbocharger 14 and either upstream or downstream of throttle 84, while still upstream of the HP EGR inlet.

Sensors may also provide information as to valve position for feedback control, such as for any or each of valves 34, 84, 76, and 78. Also, exhaust pressure in the LP EGR system may be provided by pressure sensor 90 via signal 92. In addition, exhaust gas oxygen concentration, which can be indicative of air-fuel ratio, can be provided by oxygen sensor 72. Additional sensory inputs can also be received by the ECU along signal line 62 such as engine coolant temperature, engine speed, and throttle position. Additional operator inputs 68 are received along signal 70 such as acceleration pedal position. Based on the sensory inputs and engine mapping data stored in memory, the ECU controls the EGR systems, throttles, and VGT to regulate the intake airflow, recirculated exhaust gases, and/or the intake manifold pressure (MAP) and controls injectors 20 to regulate fuel delivery.

Under some conditions, in order to reach a desired total EGR flow rate in the intake manifold at certain speeds and loads, one or both of the LP and HP EGR systems may be used. In other words, only the HP EGR loop is used under some conditions, only the LP EGR loop is used under other conditions, and both loops are used under still other conditions. However, since EGR may take one or more paths under different conditions, it can be difficult to determine an amount and composition of, as well as control, a quantity of EGR flow in the intake manifold.

One example approach for estimation and control offers an improved solution for the control of low pressure EGR, and offers improved accuracy in transients and improved robustness in the face of noise factors. This example utilizes a set of sensors that can provide an indication of both the LP and HP EGR mass flow. In this way, the flows may be independently identified and thus accurately controlled. In one embodiment, a mass airflow sensor located upstream of the LP EGR inlet, along with additional flow and/or pressure sensors, may be used to advantage in providing accurate estimation and control of low pressure and high pressure EGR flow.

Figure 2:
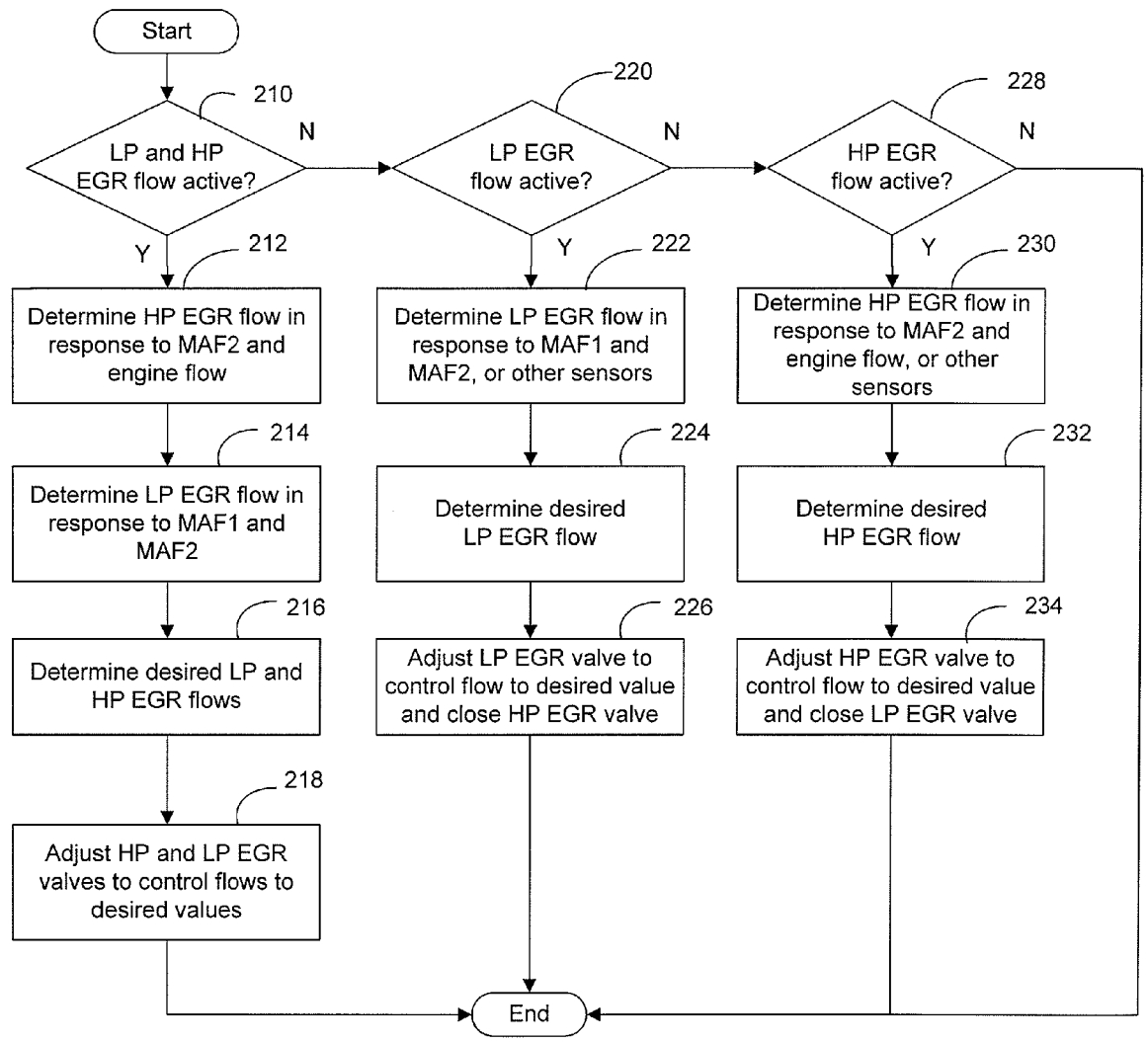
FIGS. 2-3 are high level flowcharts of example operation.

Referring now to FIG. 2, a routine is described for controlling LP and HP EGR valves. In this example, the routine first determines in 210 whether both high and low pressure EGR systems are active. If so, the routine continues to 212 to determine the high pressure EGR flow. This flow can be estimated by determining the amount of flow entering a defined volume, such as the intake manifold from the entrance of the LP EGR system to the engine, the amount of flow exiting the volume, and any flow compressibility in the volume. In one example, the flow exiting is the flow entering the engine (W_eng), which can be calculated from volumetric efficiency (stored in the ECU as a function of speed and other engine operating parameters) and the manifold pressure (MAP) from sensor 50. The flow entering can be determined from sensor 64 (MAF2), if such a sensor is provided. In an alternative embodiment, the flow entering can be estimated from the pressure drop across throttle 84 using an orifice flow equation.

Thus, in one approach, the following dynamic equation may be used to determine the HP EGR flow (W_egr_hp):

$$W\_egr\_hp = d(m\_int)/dt + W\_eng - MAF2$$

where MAF2 is the flow measured by the MAF sensor downstream of the LP EGR valve and represents the sum of fresh air and LP EGR flows, W_eng is the charge flow into the engine, and is calculated from volumetric efficiency and m_int is the estimated mass of gases in the intake manifold based on the ideal gas law.

Next, in 214, the routine determines the LP EGR flow present which can be determined based on the total flow upstream of the HP EGR inlet (e.g., MAF2) minus the flow entering the intake (e.g., 42 measured by MAF1). Alternatively, flow entering the intake may be estimated based on the pressure values upstream and downstream of throttle 78 using an orifice flow equation, if desired.

Next, in 216, the routine determines the desired LP and HP EGR flows based on operating conditions, such as speed and load. Then, in 218, the routine adjusts the LP and HP EGR valves (34,76) based on comparing the desired flows to the estimated or measured values. In one example, a feedback controller, such as a proportional or proportional-integral (PI) controller may be used, where the valve commands are determined as:

$$Cmd\_egr\_lp = PI(W\_EGR\_lp - W\_EGR\_lp\_des(N, trq))$$

$$Cmd\_egr\_hp = PI(W\_EGR\_hp - W\_EGR\_hp\_des(N, trq))$$

where $Cmd\_egr_{l\_p/hp}$ are the adjustments, or commanded duty cycle or positions to the EGR valves, and W_EGR_lp/hp_des are the desired low pressure and high pressure EGR flows, which may be a function of speed (N), torque (trq), load or other engine operating conditions.

If the answer to 210 is no, the routine continues to 220 to determine whether the LP EGR system is active. If so, the routine continues to 222 to determine the amount of LP EGR flow, such as using the calculation described above in 214. Then, the routine continues to 224 to determine a desired LP EGR flow, and then adjust the LP EGR valve in 226 based on the desired and estimated values, which may be done using a PI controller as described above.

If the answer to 220 is no, the routine continues to 228 to determine whether the HP EGR system is active. If so, the routine continues to 230 to determine the amount of HP EGR flow, such as using the calculation described above in 212. Then, the routine continues to 232 to determine a desired HP EGR flow, and then adjust the HP EGR valve in 234 based on the desired and estimated values, which may be done using a PI controller as described above.

If the answer to 228 is no, the routine closes both LP and HP EGR valves, and moves the throttles to a desired value based on operating conditions.

In this way, it is possible to provide independent and accurate control of the EGR systems by providing an accurate estimate and/or measurement of the LP and HP EGR flows. Specifically, in an embodiment using a mass airflow sensor upstream of the LP EGR inlet (and optionally using a second mass airflow sensor downstream of the LP EGR inlet), accurate determination of the LP EGR flow and thus accurate control of EGR may be achieved.

Figure 3:
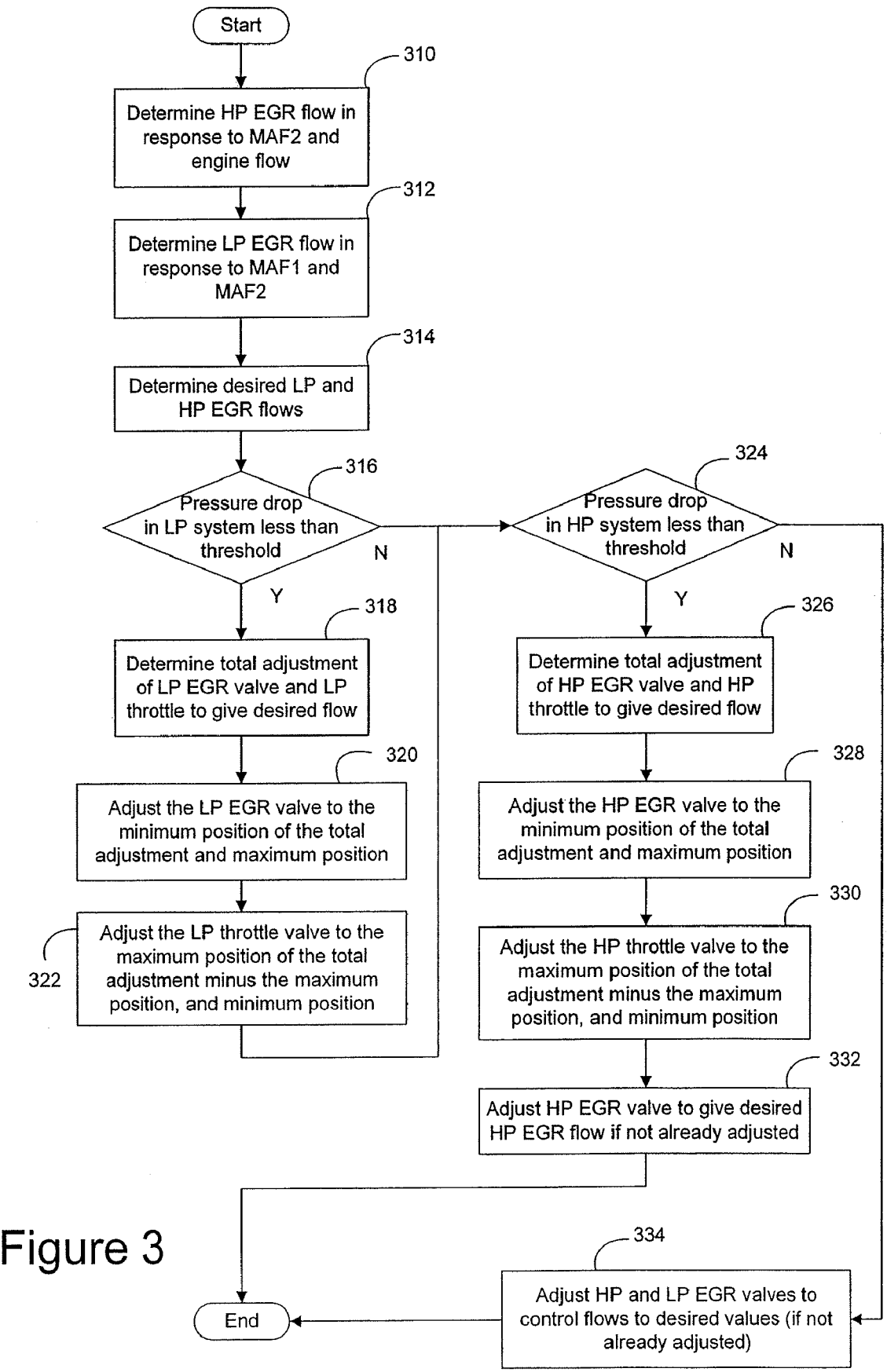

While FIG. 2 shows one example embodiment for controlling and estimating EGR flows, an alternative embodiment is described in FIG. 3. In the example of FIG. 3, coordinated control of multiple EGR valves and throttle valves is provided to provide accurate control even under varying or transient operating conditions.

Specifically, FIG. 3 shows an alternative embodiment that may be used when both LP and HP EGR flow is active. In 310-312, the routine determines values of the HP and LP EGR flows, and then determines desired HP and LP EGR flows in 314, similar to that shown with regard to 212-216 discussed above. Then, in 316, the routine determines whether the pressure differential across the LP EGR system is greater than a threshold minimum value. The threshold value may be variable, for example, it may be an amount to give a desired flow at maximum LP EGR valve position, which can be a function of operating conditions, temperature, etc. Alternatively, a fixed threshold may be used, or the routine can determine whether the LP EGR valve is open greater than a threshold amount slightly less than maximum position.

If the answer to 316 is yes, the routine continues to 318 to adjust operation of (e.g., close) the LP throttle 78 to increase a vacuum in the air pipe upstream of the compressor side of the turbocharger 14. In one example, if the pressure drop across the LP EGR valve is not sufficient, a larger pressure drop can be generated by throttling the gas upstream of the low pressure intake. In one embodiment, a single control command may be used to achieve a larger range of LP EGR flow by using the following control structure carried out in 320 and 322:

$$Cmd\_egr\_lp = PI(W\_EGR\_lp - W\_EGR\_lp\_des(N, trq))$$

$$Cmd\_egrvv\_lp = \min(1, cmd\_egr\_lp)$$

$$Cmd\_egrthr\_lp = \max(0, cmd\_egr\_lp - 1)$$

where N is engine speed, trq is desired torque, min( ) is a minimum function, 1 is a unitless representation of maximum valve position, and max( ) is a maximum function.

A similar approach can then be taken for the HP EGR system if insufficient flow is obtained as determined at 324. For example, in 326-330, the following structure may be used:

$$Cmd\_egr_{h\_p} = PI(W\_EGR\ hp - W\_EGR\_hp\_des(N, trq))$$

$$Cmd\_egrvv\_hp = \min(1, cmd\_egr\_hp)$$

$$Cmd\_egrthr\_hp = \max(0, cmd\_egr\_hp - 1)$$

Continuing with FIG. 3, if the answer to 324 is no, the routine continues to 334 to adjust the LP and HP EGR valve positions to achieve the desired flow as noted above with regard to 218.

While the above example adjusts EGR and/or throttle valve positions to obtain desired HP and LP EGR flows that are a function of conditions such as speed and load, other control objectives may be used. For example, the routine can adjust set points, or desired values, of HP and LP EGR flows to achieve a desired intake manifold temperature, $T\_int\_des$ ($N,trq$), which is itself a function of engine operating conditions. For example:

$$W\_EGR\ hp\_des = W\_EGR\_hp\_des\_ff + PI(T\_int - T\_int\_des(N.trq))$$

$$W\_EGR\_lp\_des = W\_EGR\_lp\_des\_ff - PI(T\_int - T\_int\_des(N.trq))$$

where $W\_EGR\_hp/lp\_des\_ff$ is the initial desired hp/lp EGR flow, which may be based on speed and load, for example.

In this way, it is possible to adjust HP and LP EGR flows, while also controlling intake manifold temperature, for example. Such operation may be used to advantage in achieving a desired cylinder charge temperature for low temperature homogenous charge compression ignition combustion, where the temperature rise of compression causes ignition rather than the injection timing of diesel fuel. Still other advantages may be achieved in that by controlling intake manifold temperature, exhaust temperature may be affected.

In still another alternative embodiment, the routine can control a LP/HP EGR fraction. In other words, the ratio of the EGR flows may be adjusted to vary during operating conditions, and be controlled via coordinated adjustment of the EGR and/or throttle valves as:

$$X\_egr\_lp = W\_egr\_lp/W\_eng$$

$$X\_egr\_hp = W\_egr\_hp/W\_eng$$

where $X\_egr\_lp$ is the fraction of LP EGR flow, and $X\_egr\_hp$ is the fraction of HP EGR flow. These values can then be controlled via the PI controller discussed above with regard to FIGS. 2 and/or 3. Further, intake manifold temperature control may also be included, if desired.

In yet another alternative embodiment, the routine can further include control of a burnt gas fraction. For example, using an exhaust lambda sensor (e.g., 72) the routine can estimate the burnt gas fraction in the LP and HP EGR flows and control the LP/HP burnt gas fractions in the intake manifold. In this example, additional sensor information may be used, such as the temperature in the intake manifold (58).

Specifically, the fraction of inert gas in the intake manifold ($f\_man$) is discriminated into the fraction coming from the low pressure loop ($f\_man\_lp$) and the fraction of inert gas coming from the high pressure loop ($f\_man\_hp$). Each of these fractions is observed based on the previously described sensors and the specific space velocity of each EGR loop. These observers, which may be responsive to the lambda sensor and temperature sensor, allow an accurate estimation of the re circulated gas composition.

In one approach, the following differential equations may be used to model variations of the fraction in the intake manifold of inert gas coming from low pressure EGR loop and high pressure EGR loop, respectively:

$$d(f\_man\_lp)/dt = [(Fegrlp*(MAF2 - MAF1) - f\_man\_lp*(MAF2 + W\_egr\_hp)]/Mman$$

$$d(f\_man\_hp)/dt = [(Fegrhp\_f\_man\_hp)* W\_egr\_hp - f\_man\_hp* MAF2]/Mman$$

where Fman is the fraction of EGR gas in the manifold, $f\_man\_lp$ is the fraction of EGR gas in the intake manifold coming from the low pressure EGR loop; $f\_man\_hp$ is the fraction of egr gas in the intake manifold coming from the high pressure EGR loop; Mman is the mass of gas in the manifold volume, $f\_egr\_lp$ is the fraction of EGR gas at the outlet of the EGR low pressure manifold (which may be approximated by inversion the measured lambda value in the exhaust pipe with an additional transport delay which is specific to the LP EGR loop), $f\_egr\_hp$ is the fraction of EGR gas at the outlet of the EGR high pressure manifold (which can be approximated by the inversion of the measured lambda value in the exhaust pipe with an additional transport delay which is specific to the HP EGR loop), and noting that Fman equals the combination of $f\_man\_hp$ and $f\_man\_lp$, $W\_egr\_lp$ equals the difference between MAF2 and MAF1, and $W\_egr\_hp$ equals the difference between $W\_eng$ and MAF2.

A double control of the $f\_man\_lp$ and $f\_man\_hp$ may be so performed, via their respective valves, in a de-correlated way to achieve the desired fraction of inert gas in the intake manifold within bandwidth constraints as imposed by each loop and their interaction with engine cycle dynamic time scales, Further improvement in the robustness of the control may be achieved with the use of the lambda sensor though a more accurate knowledge of the composition of the re-circulated gases.

More precisely desired values for the fraction of high and low pressure EGR ($f\_man\_lp\_des$ and $f\_man\_hp\_des$) can be determined from a single desired fraction as:

$$f\_man\_lp\_des\ k * f\_man\_des$$

$$f\_man\_hp\_des\ (1-k)* f\_man\_des$$

So that $f\_man\_des = f\_man\_hp\_des + f\_man\_lp\_des$ where $f\_man\_des$ is the desired total fraction of burnt gas in the intake manifold, $f\_man\_lp\_des$ is the desired fraction of burnt gases in the intake manifold coming from the low pressure loop, $f\_man\_hp\_des$ is the desired fraction of burnt gases in the intake manifold coming from the high pressure loop, and k is an element of [0;1] and is the weight which determines the transfer of effort from one EGR loop to the other.

In other words, as k increases, $f\_man\_lp\_des$ increases, $fman\_hp\_des$ decreases, and thus a higher fraction of burnt gases in the intake manifold is requested to from the low pressure EGR loop and vice versa. The determination of k at the engine conditions allows a better scheduling of the use of the EGR loops based on their specific constraints. The parameter k may be varied as a function of any number of operating conditions, such as, for example, engine temperature, speed, load etc to satisfy some predetermined (or instantaneously established) set of constraints on the intake charge composition and or temperature as the case may be.

Control of inert gas fractions can also be combined with the coordinated control of the EGR valves and throttle valves, and intake charge temperature control, if desired. Further, as noted below herein, compensation for transport delays may also be included.

As noted above herein, various measurement locations for flows may be used. In one example, since the EGR and/or mass flows are measured upstream of the intake manifold, it may be possible to compensate for flow delays in the low pressure EGR flow by estimating the transport delay between the LP EGR inlet and intake manifold and the high pressure EGR by estimating transport delay between HP EGR inlet and intake manifold. The transport delays may be estimated by dividing the pipe volume by a volumetric flow speed based on a representative density. Then, the routine can compensate for the flow delays by adjusting the desired flow amounts.

Figure 4:
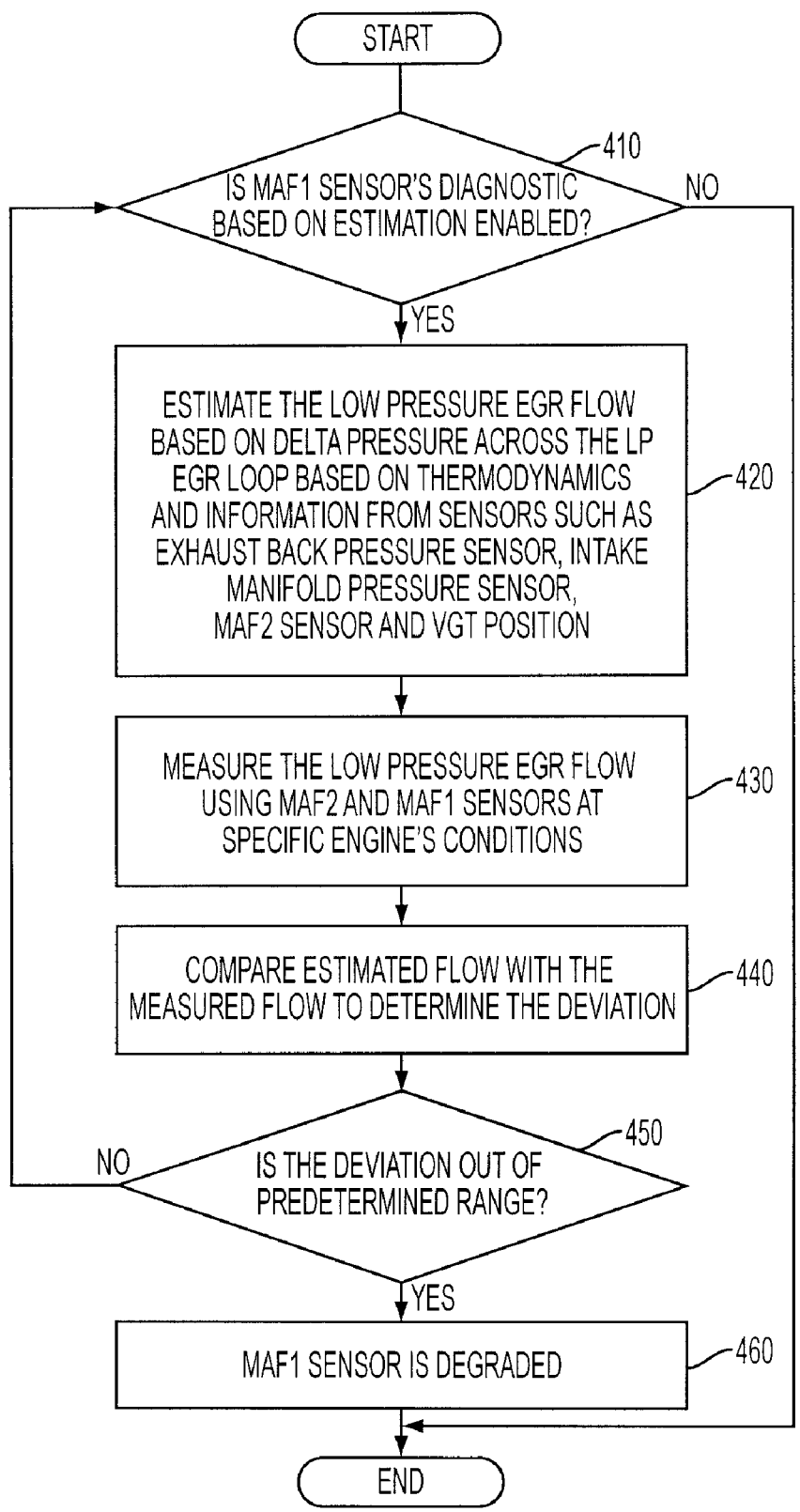
FIG. 4 is an example flowchart of a first diagnostic method for a mass air flow (MAF) sensor in an exhaust gas recirculation (EGR) system with a high pressure EGR loop and a low pressure EGR loop.

To perform the control methods and systems described above, in some embodiments, a mass air flow sensor such the MAF1 sensor 80 in FIG. 1 may be used to determine the flow-rate in the low pressure EGR manifold. Thus, a diagnostic strategy for the MAF1 sensor 80 may be used to improve the robustness of the control methods and systems. FIG. 4 is an example flowchart of a first example diagnostic method for a mass air flow sensor in an exhaust gas recirculation (EGR) system with a high pressure EGR loop and a low pressure EGR loop. In this example, the diagnostic of the MAF1 sensor may be based on a measured MAF signal from another MAF sensor and estimated values.

The routine first determines in 410 if the diagnosis of the MAF1 sensor based on estimation is enabled. If so, the routine continues to 420 to estimate the low pressure EGR flow. The estimation can be based on a delta pressure across the low pressure EGR loop, which is the difference between the pressure at the inlet of the low pressure EGR loop (P_inlet_lp_egr) and the pressure at the outlet of the low pressure EGR loop (P_outlet_lp_egr). The estimation of the delta pressure across the low pressure EGR loop may be based on physical principles of thermodynamics such as mass conservation and standard orifice flow equation, for example. Using these principles, the flow of low pressure EGR may be estimated based on information from sensors commonly installed in an engine, such as exhaust back pressure sensor (upstream turbine, pressure sensor 54), intake manifold pressure sensor (MAP sensor), MAF2 sensors and VGT position.

The orifice flow equation for the low pressure EGR loop provides the relationship between flow, pressure drop, and geometrical considerations (such as EGR valve cross section A_lp_egrv):

$$W\_egr\_lp = f_0(A\_lp\_egrv, P\_inlet\_lp\_egr, P\_outlet\_lp\_egr)*Rho\_lp\_egr$$

where Rho_lp_egr is the massic density of the low pressure EGR gases.

When P_inlet_lp_egr can be assumed as the pressure downstream of an emission control device such as 74 in FIG. 1 (P_down_dpf) and P_outlet_lp_egr can be assumed as the pressure upstream compressor (P_up_comp), the above equation becomes:

$$W\_egr\_lp\_estimated = v(A\_lp\_egrv, P\_down\_dpf, P\_up\_comp)*Rho\_lp\_egr$$

So, an estimation of Rho_lp_egr, P_down_dpf and P_up_comp is used for the estimation of W_egr_lp.

Several approximations may be used to estimate P_down_dpf, P_up_comp, and Rho_lp_egr. First, a P_down-dpf approximation may be estimated using mass conservation and standard orifice flow equation across turbine 38 as below:

$$Wexh = W\_massfuel + MAF2 = u(W\_massfuel, MAF2)$$

$$Wexh = f(VGTpos, Pexh\_upturbine, Pexh\_downturbine).$$

Thus, the exhaust pressure downstream of the turbine, Pexh_downturbine, is a function of VGT position (or a cross sectional area of the flow passing through the turbine), the exhaust pressure upstream of the turbine, Pexh_upturbine, and exhaust flow as shown below:

$$Pexh\_downturbine = g(Wexh, VGTpos, Pexh\_upturbine) \text{ or}$$

$$Pexh\_downturbine = h(u(W\_massfuel, MAF2), VGTpos, Pexh\_upturbine)$$

In some embodiments, emission control devices such as diesel particulate filter, oxidation catalyst, selective catalytic reduction catalyst, NOx trap, or combinations may be disposed downstream of the exhaust pipe or in the low pressure EGR loop. Thus, the estimation of the pressure downstream of the emission control device (P_downdpf) is used, which can be calculated as below:

$$P\_downdpf = P\_updpf - DeltaPdpf$$

where DeltaPdpf is the pressure drop across the emission control device and P_updpf is the pressure upstream the emission control device, in this example the DPF. P_updpf can be estimated by a model based on gas viscosity and exhaust flow as below:

$$P\_updpf = Pexh\_downturbine + z(viscosity, W\_exh).$$

In one approach, DeltaPdpf may be determined by a delta pressure sensor. In another approach, an estimation of the soot load and other engine variables or events such as diesel filter regeneration or catalytic converter operation may be used to estimate the pressure across the emission control device. Thus, the pressure downstream of the emission control device may be estimated as:

$$P\_downdpf = h(u(W\_massfuel, MAF2), VGTpos, Pexh\_upturbine) + z(viscosity, W\_exh) - DeltaP\_dpf.$$

Second, the approximation of P_up_comp may be estimated using standard orifice flow equation across compressor 36 as below:

$$MAF2 = f_2(Compressor\_cross\_section, P\_up\_comp, P\_intake\_manifold) * Rho\_up\_compressor$$

where Compressor_cross_section is the cross sectional area through which gases pass in the compressor; and Rho_up_compressor is the mass density of the gas passing the compressor 36 and P_intake_manifold is the pressure downstream of compressor or the intake manifold pressure (MAP) of the engine. In one approach, Rho_up_compressor can be estimated based on speed density relationship upstream of the compressor. The above equation can be rearranged into:

$$P\_up\_comp = g(MAF2, T\_up\_compressor, P\_up\_comp, Compressor\_cross\_section, P\_intake\_manifold).$$

In some embodiments, since a usual speed density sensor, such as MAF sensor (also called T-MAF), may provide information on the temperature, the temperature T_up_comp may be available through this sensor. In other embodiment, T_up_comp may be determined by a model.

Third, the approximation of Rho_lp_egr may be estimated using the ideal gas law as below:

$$Rho\_lp\_egr = P\_up\_comp/(R*T\_lp\_egr).$$

The temperature of low pressure EGR gas T_lp_egr may be determined in various ways. In one approach, T_lp_egr can be estimated based on heat transfer equation and temperature sensor measured from the two MAF sensors upstream and downstream low pressure EGR inlet. In another approach, T_lp_egr can be determined by a model based on engine set point or other temperature sensors.

Using the three approximations described above, the flow of low pressure EGR can be estimated as:

W_egr_lp_estimated=v(A_lp_egrv, g(MAF2, T_up_compressor, P_up_comp, Compressor_cross_section, P_intake_manifold), (u(W_massfuel, MAF2), VGTpos, Pexh_upturbine)+z(viscosity, W_exh)−DeltaP_dpf)*Rho_lp_egr.

Alternatively, the flow of low pressure EGR may be estimated as a function of variable engine operating parameters:

W_egr_lp_estimated=f(tqi, n, T_dpf, deltaPdpf, w_exh, dpf_regen events)

where tqi is indicated torque, n is the speed of the engine and dpf_regen events is the regeneration events of a diesel particulate filter or a catalyst converter.

Now continuing to 430, the routine measures the low pressure EGR flow using the MAF2 and MAF1 sensors at specific engine conditions. The measured low pressure EGR flow can be determined based on the total flow upstream of the high pressure EGR inlet (MAF2) minus the flow entering the intake of the low pressure EGR (e.g., MAF1). Next, the routine, in 440, compares the estimated flow with the measured flow to determine the deviation. Then, the routine, in 450, determines if the deviation is outside of a predetermined range. If so, the routine, in 460, determines that the MAF1 sensor is degraded. In this way, it is possible to provide accurate degradation detection of the MAF1 sensor.

Figure 5:
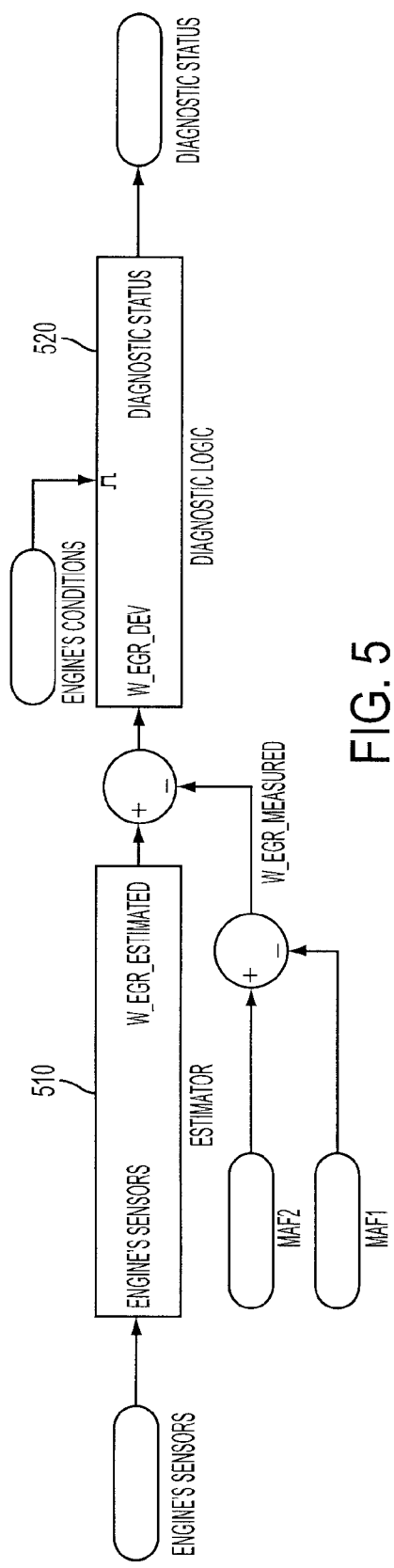
FIG. 5 is an overview of the diagnostic method described in FIG. 4.

FIG. 5 is an overview of the diagnostic method and system described in FIG. 4. The diagnostic system may comprise an estimator 510 where information from engine sensors are used. Information may include flow measured by the MAF2 sensor, fuel mass flow, exhaust flow, temperature upstream of compressor, pressures upstream of compressor, intake manifold pressure, exhaust pressure upstream of turbine, pressure drop across an emission control device disposed in the low pressure EGR loop, low pressure EGR valve cross section area, compressor cross section area, VGT opening position, viscosity, etc. The system may also comprise a estimator where the measured flow of low pressure EGR loop is determined based on flows measured by MAF1 and MAF2. Another estimator may be used to compare the estimated flow with measured flow and then input the deviation into a diagnostic logic. In the diagnostic logic 520 of the system, deviation and engine's conditions are analyzed to diagnose the MAF1 sensor's status.

Figure 6:
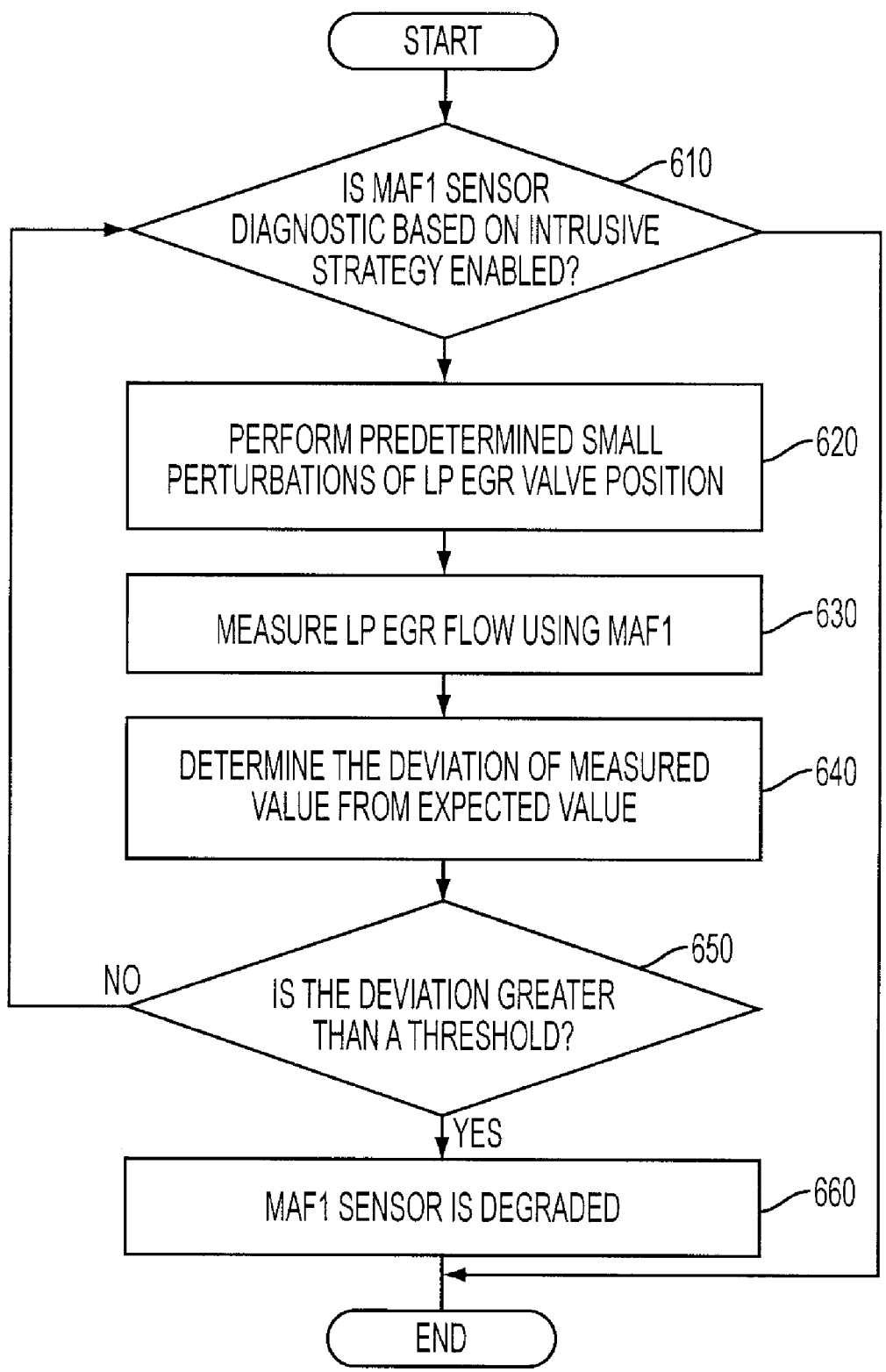
FIG. 6 is an example flowchart of a second diagnostic method for a MAF sensor in an EGR system with a high pressure EGR loop and a low pressure EGR loop.

FIG. 6 is an example flowchart of a second diagnostic method for a MAF sensor in an EGR system with a high pressure EGR loop and a low pressure EGR loop. An intrusive strategy is used in this diagnostic approach. The routine first, in 610, determines if diagnostics of the MAF1 sensor based on an intrusive strategy is enabled. Such intrusive monitoring may be disabled under conditions where the intrusive action may cause operation noticed by the driver, for example.

If the intrusive diagnostic is enabled, the routine continues to 620 to perform a predetermined small perturbation of low pressure EGR valve position. Next, the routine, in 630, measures the flow passing through the MAF1 sensor. Then, the routine, in 640, determines the deviation of measured value from the expected value. Next, the routine, in 650, determines if the deviation is greater than a threshold. If the answer is no, the routine goes back to 610. If the answer is yes, the routine, in 660, determines that MAF1 sensor is degraded.

Figure 7:
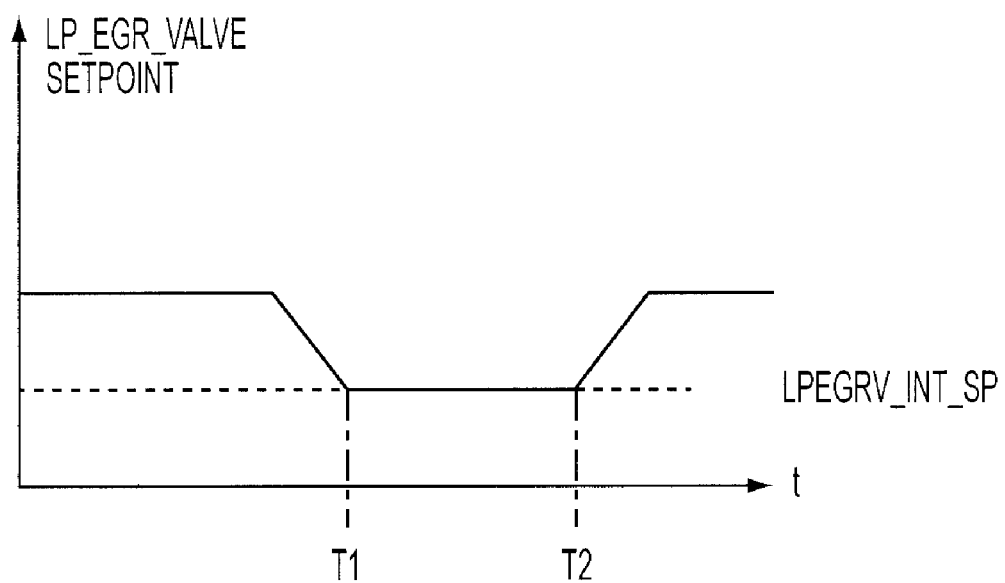
FIG. 7 shows the change of low pressure EGR valve position with time to illustrate the diagnostic method described in FIG. 6.

One example of an intrusive strategy is illustrated in FIG. 7 where the change of low pressure EGR valve position with time is shown. The lpegrv_int_sp is the low pressure EGR valve intrusive setpoint. lpegrv_int_sp may also be a function of torque and engine speed or any specific engine conditions such as temperatures, engine states, etc.

Figure 8:
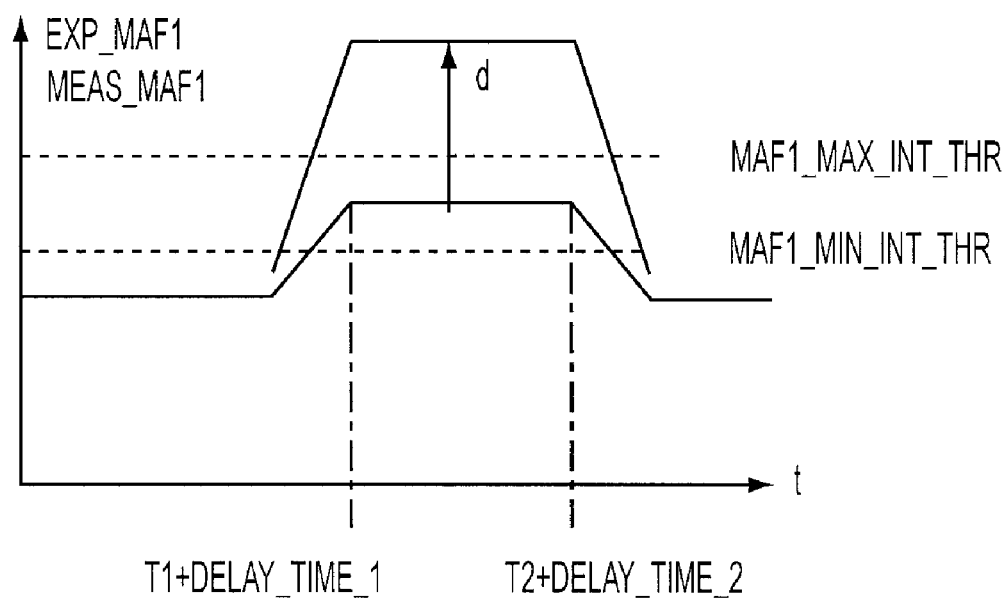
FIG. 8 shows the change of expected MAF and measured MAF with time to illustrate the diagnostic method described in FIG. 6.

FIG. 8 shows the change of expected flow and measured flow rate from MAF1 sensor with time in response to the intrusive event illustrated in FIG. 7. Maf1_max_int_thr is the maximum threshold from which a positive deviation between measured MAF1 (Meas_MAF1) and expected MAF (Exp_MAF1) is taken into account. Maf1_min_int_thr is the minimum threshold from which a negative deviation between measured MAF1 and expected MAF1 is taken into account. T1, T2, delay_time_1, delay_time_2 are functions of torque and engine speed or related to some engine's conditions or engine's events.

The MAF deviation detection may be illustrated in one intrusive event shown in the FIGS. 7 and 8 where the low pressure EGR valve intrusive setpoint is set to lpegrv_int_sp during T2−T1. At time t element of T[T1+delay_time_1; T2+delay_time_2], at k discrete element of [0; N] where this interval represents the discretisation of the time interval T, if (Meas_MAF1<MAF1_min_int_thr or Meas_MAF1>MAF1_max_int_thr), then:

$$d(k) = \text{Meas\_MAF1}(k) - \text{Exp\_MAF1}(k)$$

$$\text{Average\_d} = \frac{\sum_{k=0}^{k=N} d(k)}{N}$$

Average_d represents the average value of the deviation during one intrusive event. Average-d may be used to determine if the MAF1 sensor is functioning at an acceptable level. Alternatively, several threshold criterions may be used to detect if the MAF1 sensor is degraded. The criterions may include inverted behavior of the MAF sensor, offset deviation, measure stuck to a value, and degradation of the time response.

In another approach, Average_d may be averaged over the number of intrusive events to determine an aging tendency of the MAF1 sensor. This strategy can identify the MAF1 sensor as a non functional device depending on detection of deviation over the time of use.

In this way, it is possible to utilize the response of the low pressure EGR system to monitoring functionality to isolate degradation of the MAF1 sensor.

Figure 9:
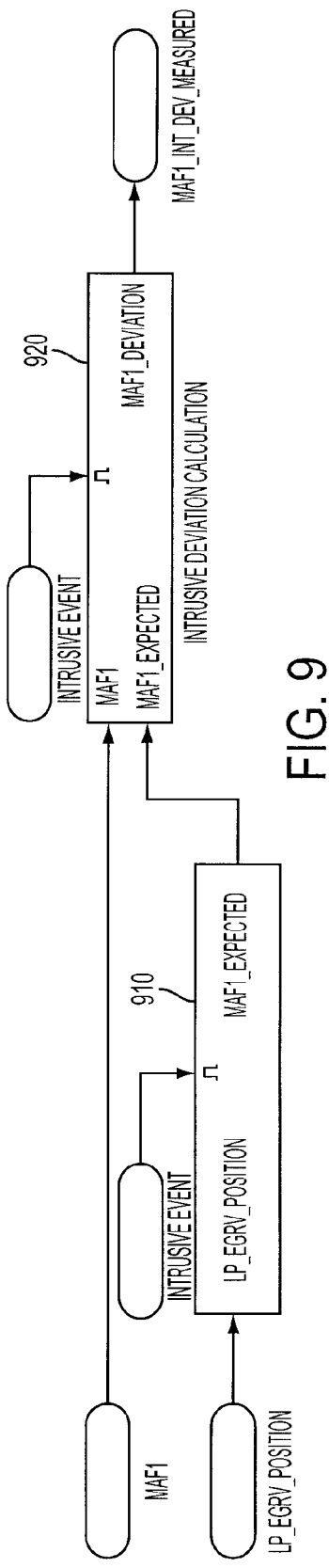
FIG. 9 is an overview of the diagnostic method described in FIG. 6.

FIG. 9 is an overview of the diagnostic method and system described in FIG. 6. At intrusive event, low pressure EGR valve position, LP_EGR_position is set which corresponds to an expected MAF1 flow value, MAF1_EXPECTED, which are input into the estimator 910. The diagnostic method also includes an intrusive deviation calculation 920 where the expected MAF1 value from estimator 910 and measured MAF1 1value are input and analyzed to determine a MAF1_deviation. In one embodiment, an intrusive event may be introduced into intrusive deviation calculation 920. The output from intrusive deviation calculation 920 is a measured deviation, MAF1_INT_DEV_MEASURED.

Figure 10:
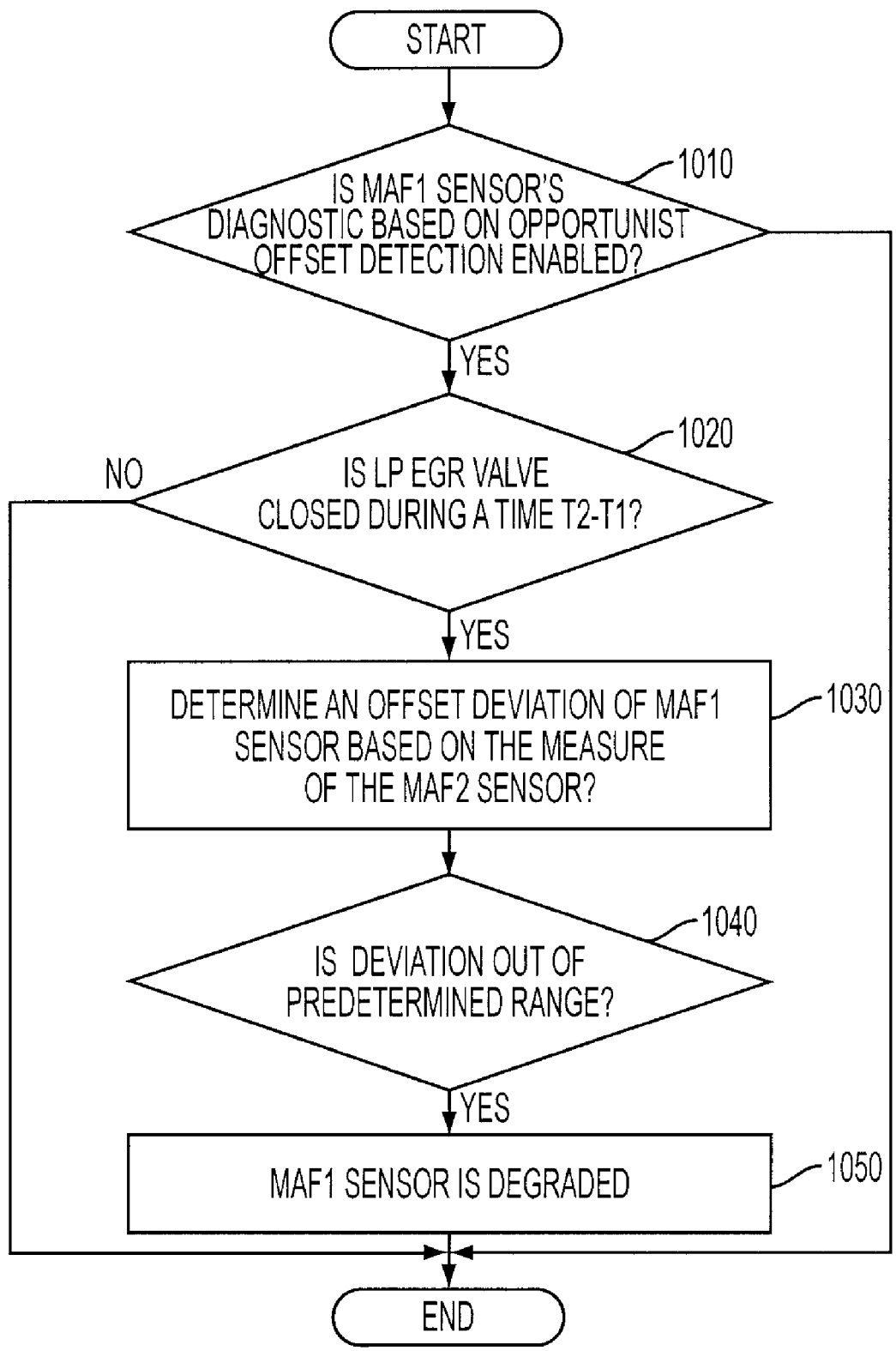
FIG. 10 is an example flowchart of the third diagnostic method for a MAF sensor in an EGR system with a high pressure EGR loop and a low pressure EGR loop.

FIG. 10 is an example flowchart of the third diagnostic method for a MAF sensor in an EGR system with a high pressure EGR loop and a low pressure EGR loop. First, the routine, in 1010, determines if the diagnostic for the MAF1 sensor based on an opportunistic offset detection is enabled. If so, the routine, in 1020, determines if the low pressure EGR valve is closed during a time period of T2−T1. If the answer is no, the routine ends. If the answer is yes, the routine, in 1030, determines an offset deviation of the MAF1 sensor based on the measure of the MAF2 sensor. Next, the routine, in 1040, determines if the deviation is out of a predetermined range. If so, the routine, in 1050, determines that MAF1 sensor is degraded.

In the example above, the diagnostic approach is based on opportunist offset detection. At certain engine conditions, the low pressure EGR valve may not be used and stay closed. In these situations, the flow passing through the MAF1 sensor (sensor 80 for example) should be the substantially same as the flow passing through the MAF2 sensor (sensor 60 for example). Assuming that the MAF2 sensor provides an accurate reading and can be considered as a reference, an offset deviation or a degraded response time may be detected if the MAF1 sensor is degraded when the low pressure EGR valve is closed.

In one approach, considering some engine conditions and the situation where the low pressure EGR valve stays closed during a time T2−T1, for t element of [T1;T2], the deviation may be defined as:

$$d = MAF1(t) - MAF2(t+\text{transport\_delay})$$

where transport_delay can be defined as a function of MAF2(t), the temperature upstream compressor and pressure downstream compressor. Alternatively, the transport_delay may be defined as function of tqi and engine speed.

Further, using this approach, the deviation in steady state may be identified where there is no more need to evaluate the transport delay.

Figure 11:
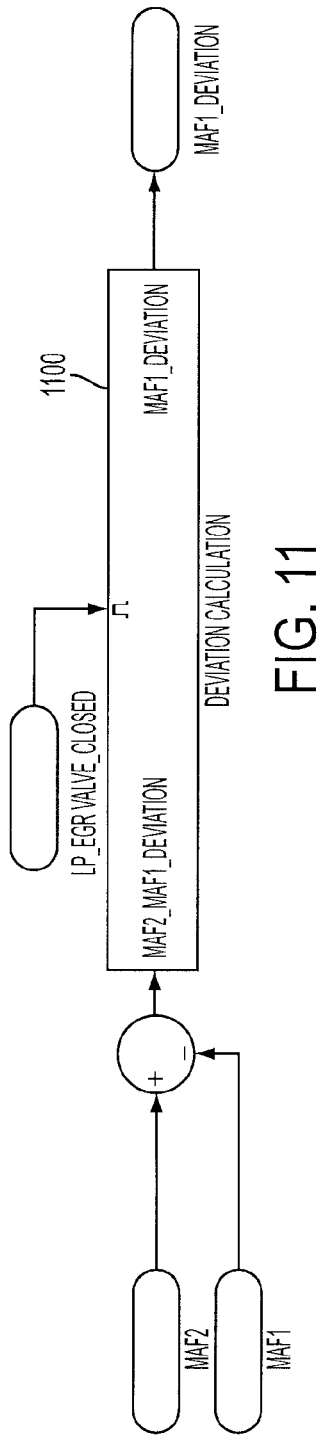
FIG. 11 is an overview of the diagnostic method described in FIG. 10.

FIG. 11 is an overview of diagnostic method and method described in FIG. 10. The diagnostic strategy includes a calculator where the measured flows from MAF2 and MAF1 sensors are calculated to determine the deviation. Then, the results are input into deviation calculation 1100 where deviation of the MAF1 sensor is analyzed based on the deviation between MAF2 and MAF1 sensor at the condition where the low pressure EGR valve is closed.

Figure 12:
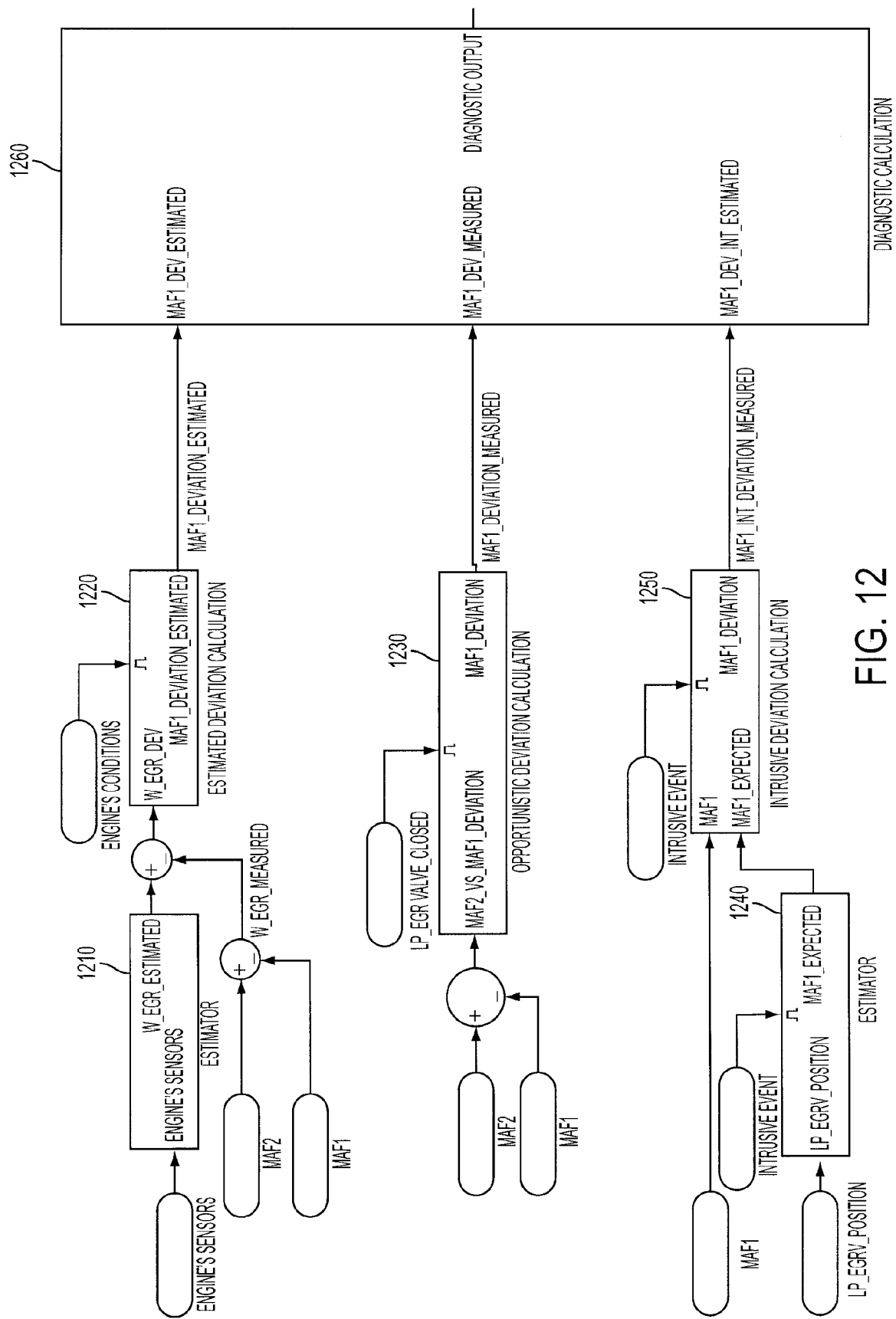
FIG. 12 is an overview of a fourth diagnostic method for a MAF sensor in an EGR system with a high pressure EGR loop and a low pressure EGR loop.

FIG. 12 is an overview of a fourth diagnostic method and system for a MAF sensor in an EGR system with a high pressure EGR loop and a low pressure EGR loop. This strategy combines each of the three approaches described above. For example, the diagnostic calculation 1260 may receive a MAF1_DEV_ESTIMATED after input data are processed by the estimator 1210 based on the first embodiment (estimation strategy) described above associated with FIGS. 4 and 5. The diagnostic calculation 1260 may also receive a MAF1-DEV_INT_ESTIMATED after input data are processed by the estimator 1240 and intrusive deviation calculation 1250 based on the second embodiment (intrusive strategy) described above associated with FIGS. 6, 7, 8 and 9. Additionally, the diagnostic calculation 1260 may receive a MAF1_DEV_MEASURED after the input data are processed by the opportunist deviation calculation 1230 based the third embodiment (opportunist offset detection) described above associated with FIGS. 10 and 11. The diagnostic strategy may analyze the deviations based on priorities and logical combinations. For example, an average of each method may be used, or the methods may be used sequentially. In this way, it is possible to determine the type of deviation of the MAF1 sensor and thus improves the accuracy of the diagnostic.

The diagnostic strategies described above are advantageous for the operation of the EGR flows in a diesel engine with a dual EGR loop system. For example, undesired emission level due to an overflow or underflow of the low pressure EGR gases may be estimated through the diagnostic, and then corrected or reduced by disabling one or both of the high pressure and low pressure EGR systems, for example.

Figure 13:
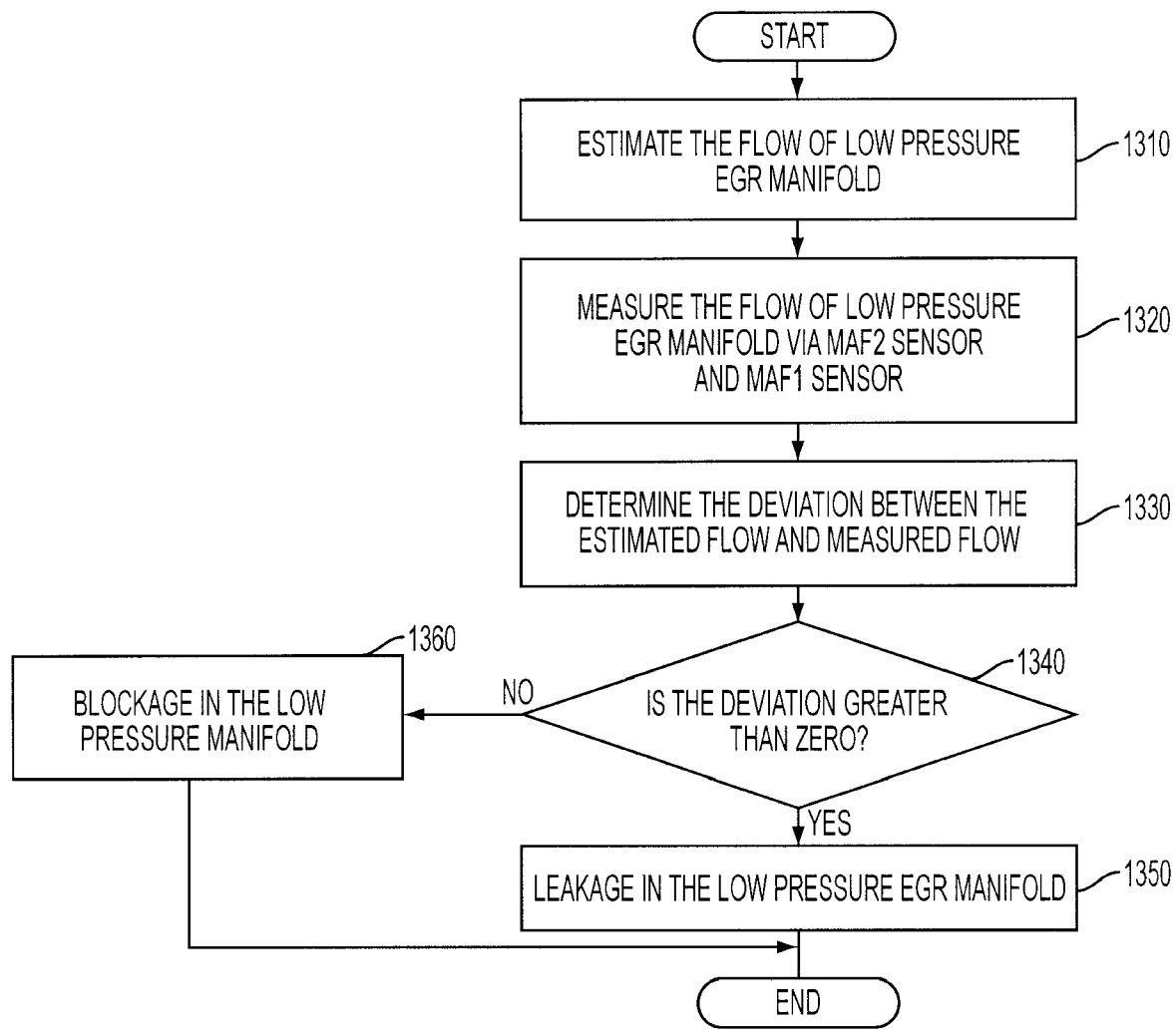
FIG. 13 is an example flowchart of a method to detect leakages or blockages in the manifold of the low pressure EGR loop.

FIG. 13 is an example flowchart of a method to detect leakages or blockages in the manifold of the low pressure EGR loop. The routine assumes that the MAF1 and MAF2 sensors are properly functioning. The detection and estimation of the leakage or blockage is performed based on a comparison between the measure of the flow through the low pressure EGR manifold (MAF2−MAF1) and an estimator of the low pressure EGR flow. First, the routine, in 1310, estimates the flow of the low pressure EGR manifold. The estimation may be performed by incorporating information from the sensors on an engine to physical models or a map. One example of the estimation has been described above in association with FIG. 4. In one embodiment, the flow of the low pressure EGR manifold may be estimated based on delta pressure across the LP EGR loop based on thermodynamics and information from sensors such as exhaust back pressure sensor, intake manifold pressure sensor, MAF2 sensor and VGT position. Next, the routine, in 1320, measures the flow of the low pressure EGR manifold via MAF2 and MAF1 sensors. The flow of the low pressure EGR manifold equals (MAF2−MAF1).

Next, the routine, in 1330, determines the deviation between the estimated flow and measured flow. The deviation W_egr_lp_dev equals average(W_egr_lp_estimation-(MAF 2−MAF1)). At specific engine conditions, the deviation may correspond to either a leak or a blockage. Next, the routine, in 1340, determines if the deviation is greater than zero. If so, the routine, in 1350, determines that there is a leakage in the low pressure EGR manifold. The leakage creates a flow of exhaust gases in the atmosphere. If the answer is no, the routine, in 1360, determines that there is a blockage in the low pressure EGR manifold.

In some embodiments, the amount of exhaust gas released in the atmosphere can be determined based on W_egr_lp_dev and the engine operating conditions if desired. In other embodiments, the size of the orifice responsible for the leak can be determined. For example, the orifice flow equation and the pressure evaluation in the low pressure manifold may be used to determine the size of the orifice. The pressure across the low pressure manifold may be approximated with the pressure downstream an emission control device if existed and the temperature estimation along the low pressure EGR manifold.

In this way, the robustness of the hardware of the low pressure EGR loop can be monitored, thus more accurate control of EGR may be achieved.

Figure 14:
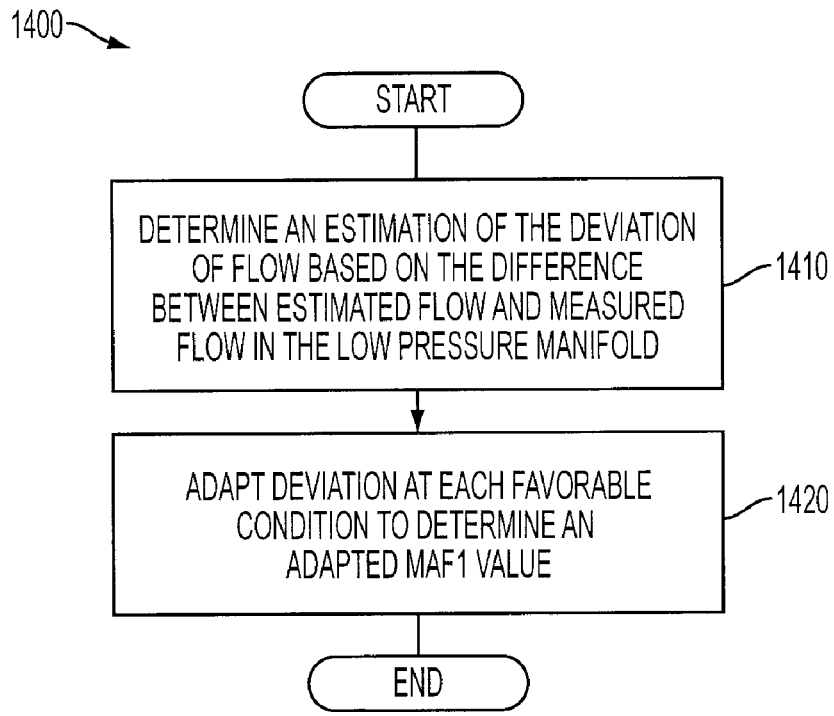
FIG. 14 is an example flowchart of one embodiment of a method for MAF sensor adaptation.

FIG. 14 is an example flowchart of one embodiment of a method of adaptation of a MAF sensor. As described above, the control of the low pressure EGR and the detection of the leakage or blockage may use information from the MAF1 and MAF2 sensors. However, the sensors may be subject to aging effects or slow variation over time. The routine 1400 provides a strategy to adapt the MAF1 sensor assuming that MAF2 has been correctly adapted by other strategies, such as based on information from a fuel injector and air-fuel ratio sensor, for example. The routine first, in 1410, determines an estimate of the deviation of flow based on the difference between estimated flow and measured flow in the low pressure manifold. In one example, the deviation may be defined below:

W_egr_dev=W_egr_estimated-(MAF2-MAF1).

In one embodiment, W_egr_dev may be determined by the approach described above associated with FIG. 4.

Next, the routine, in 1420, adapts deviation at each favorable condition to determine an adapted MAF1 value. In one example, adapted MAF1 may be defined as:

MAF1_adapted = MAF1_corr + MAF1 where MAF1_corr = W_egr_dev.

Thus,

W_egr_estimated = W_egr_dev + (MAF2 − MAF1)
 = −MAF2 − (MAF1 + MAF1_corr)
 = MAF2 − MAF1_adapted.

As a consequence, any deviation between the estimation and the adapted measure is reduced. MAF1_corr may be stored in a table function of MAF1 measure and continuously adapted at each favorable condition.

Figure 15:
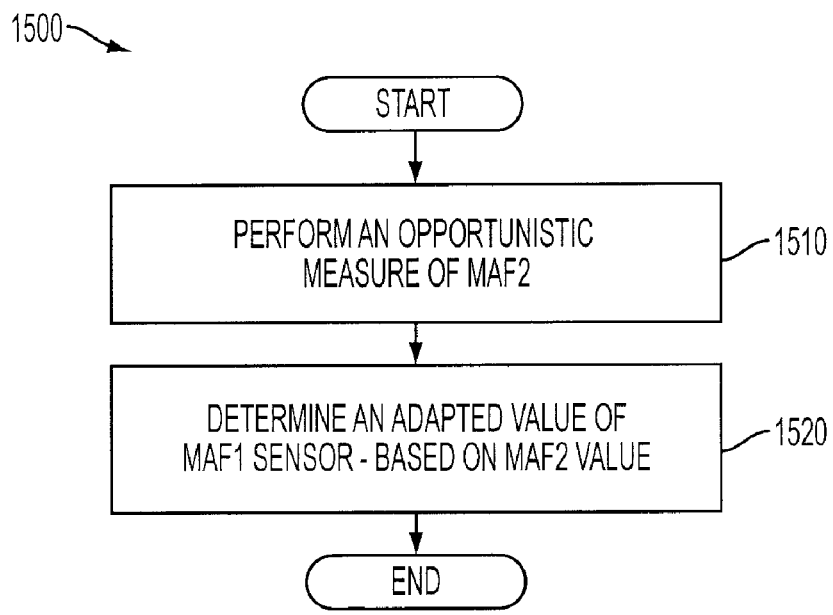
FIG. 15 is an example flowchart of another embodiment of a method for MAF sensor adaptation.

FIG. 15 is an example flowchart of another method of adaptation for the MAF sensor. At specific speeds and loads, for example, the low pressure EGR valve may remain closed. If this condition is detected, the routine 1500 may be used for adaptation of MAF1 assuming that MAF2 has been correctly adapted by other strategies. The routine first, in 1510, performs an opportunistic measure of MAF 2. It should be noted that the flow measured by MAF2 and MAF1 sensors should be the same when the low pressure EGR valve is closed and there is no aging effect on MAF1. The aging effects of MAF1 may be detected when

MAF2=MAF1+X(MAF2)

where X is the offset which may be related to aging effect of the MAF1 sensor a MAF2 value.

Next, the routine, in 1520, determines an adapted value of MAF1 based on the opportunistic measure of MAF2. The adapted MAF value may be defined as:

MAF1_adapted=MAF2=MAF1+MAF1_corr(MAF1).

Thus, MAF1_corr(MAF1)=MAF2−MAF1.

The values of MAF1_corr may be stored in a table which is a function of MAF1. In one embodiment, MAF1_corr may be adapted at each opportunistic event and used to determine the adapted value of MAF1. In another embodiment, the values of MAF1_corr may be interpolated (for a minimum of two opportunities events at different values for example), thus an adaptation of MAF1 may be performed for the whole range of MAF1.

In this way, it is possible to provide robust control of the EGR systems by providing accurate estimation of EGR flow via adaptation of degraded performance of a MAF sensor such as degradation due to aging of the MAF sensor.

Additionally, the diagnostics or adaptation strategies which are presented herein for the MAF1 sensor and are based on a comparison between the two MAF sensors can also be used for a diagnostic of the MAF2 sensor. In this approach, it is assumed that MAF1 sensor is reading accurately or has been adapted, corrected or diagnosed by other strategies such as a comparison of MAF1 measure with the computed aspirated mass flow W_ENGINE, where W_ENGINE=f(Intake manifold Pressure, Intake manifold temperature, engine speed, volumetric_efficiency (engine speed, intake manifold pressure)) when low pressure and high pressure EGR valves are closed intrusively or opportunistically.

Note that the control and estimation routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 24.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for diagnosing a degradation of a first mass flow sensor in an engine, the engine also including a first and second exhaust gas recirculation system, a turbocharger, a first exhaust gas recirculation system (EGR) coupled between the engine intake and exhaust on a high pressure side of the turbocharger, a second EGR coupled between the engine intake and exhaust on a low pressure side of the turbocharger, an EGR valve located in the second EGR, the first mass airflow sensor located in an intake manifold upstream of the second EGR inlet, a second mass airflow sensor located in an intake manifold downstream of the second EGR inlet and upstream of the first EGR inlet and upstream of the turbocharger, the method comprising:

adjusting the second EGR valve position to introduce an EGR perturbation;

measuring a flow in the inlet of the second EGR using the first mass airflow sensor, said flow including said perturbation; and diagnosing a degradation of the first sensor based on a deviation between an expected flow through the first mass airflow sensor and the measured flow by the first mass airflow sensor.

2. The method of claim 1 wherein the method further comprises controlling flows in said low pressure system and high pressure system in response to the degradation of the first mass airflow sensor.

3. The method of claim 1 wherein the method further comprises detecting a leakage or blockage of said low pressure system.

4. The method of claim 1 wherein the perturbation is an adjustment that is an additional adjustment provided in response to degradation detection being performed.

5. A method for diagnosing a degradation of a first mass airflow sensor in an engine, the engine also including a first and second exhaust gas reciroulation system, a turbocharger, a first exhaust gas recirculation system (EGR) coupled between the engine intake and exhaust on a high pressure side of the turbocharger, a second EGR system coupled between the engine intake and exhaust on a low pressure side of the turbocharger, an EGR valve located in the second EGR system, the first mass airflow sensor located in an intake manifold upstream of the second EGR inlet, a second mass airflow sensor located in an intake manifold downstream of the second EGR inlet and upstream of the first EGR inlet and upstream of the turbocharger, the method comprising:
   closing the EGR valve in the second EGR system;
   measuring a flow passing through the first mass airflow sensor and a flow passing through the second mass airflow sensor; and
   diagnosing a degradation of the first mass airflow sensor based on the flows measured by the first mass airflow sensor and the second mass airflow sensor.

6. The method of claim 5 wherein the diagnosing the degradation of the first mass airflow sensor is based on a deviation between the flows measured by the first mass airflow sensor and the second mass airflow sensor.

7. The method of claim 6 wherein the method further comprises estimating a flow in the second EGR which includes information from the second mass airflow sensor; determining a flow in the second EGR system based on information from the first and second mass airflow sensors; determining a deviation between the estimated flow and the measured flow; and adapting the flow measured by the first mass airflow sensor based on the deviation.

8. The method of claim 5 wherein the method further comprises detecting a leakage or blockage of said second EGR system.

9. A method for detecting a leakage and blockage of a second exhaust gas recirculation system (EGR) of an engine, the engine also including a first and second EGRs, a turbocharger, a first EGR coupled between the engine intake and exhaust on a high pressure side of the turbocharger, a second EGR coupled between the engine intake and exhaust on a low pressure side of the turbocharger, a first mass airflow sensor located in an intake manifold upstream of the second EGR inlet, a second mass airflow sensor located in an intake manifold downstream of the second EGR inlet and upstream of the first EGR inlet and upstream of the turbocharger, the method comprising:
   estimating a flow in the second EGR which includes information from the second mass airflow sensor;
   determining a flow in the second EGR based on information from the first and second mass airflow sensors; and
   detecting at least one of a leakage or blockage in the second EGR system based on the estimated flow and the determined flow.

10. The method of claim 9 wherein the method further comprises:
   determining a deviation between the estimated flow and the determined flow; and
   adapting the flow measured by the first mass airflow sensor based on the deviation.

11. The method of claim 9 wherein the method further comprises:
   controlling an amount of flow in the first and second EGR systems based on the first and second mass airflow sensors.

12. A system for a diesel engine having an intake manifold and an exhaust manifold, comprising:
   a turbocharger between the intake and exhaust manifolds of the engine;
   a low pressure exhaust gas recirculation system with a first end coupled to the exhaust manifold downstream of the turbocharger arid a second end couple to the intake manifold upstream of the turbocharger, said low pressure exhaust gas retriculation having a first valve coupled thereto for regulating flow;
   a high pressure exhaust gas recirculation system with a first end coupled to the exhaust manifold upstream of the turbocharger and a second end coupled to the intake manifold downstream of the turbocharger, said high pressure exhaust gas recirculation having a second valve coupled thereto for regulating flow;
   a first mass airflow sensor coupled in the engine intake manifold upstream of an inlet of said second end of said low pressure exhaust gas recirculation system; and
   a control system configured to diagnose degradation of said first mass airflow sensor, wherein said control system further comprises controlling flows in said low pressure exhaust gas recirculation system and high pressure exhaust gas recirculatlon system in response to the degradation of the first mass airflow sensor.

13. The system of claim 12 wherein the system further comprises a second mass airflow sensor coupled in the engine intake manifold upstream of said second end of said high pressure exhaust gas recirculation system and downstream of said second end of said low pressure exhaust gas recirculation system.

14. The system of claim 13 wherein said control system further comprises detecting a leakage or blockage of said low pressure system.

15. The system of claim 13 wherein said control system is further configured to:
   estimate a flow in the low pressure EGR system which includes information from the second mass airflow sensor;
   determine the flow in the low pressure EGR system based on information from the first and second mass airflow sensors; and
   diagnose said degradation of the first mass airflow sensor based on a deviation between the estimated flow and the determined flow.

* * * * *